United States Patent
Kim et al.

(10) Patent No.: US 12,195,075 B2
(45) Date of Patent: Jan. 14, 2025

(54) STEERING COLUMN FOR VEHICLE

(71) Applicant: HL MANDO CORPORATION, Gyeonggi-do (KR)

(72) Inventors: Jonghan Kim, Gyeonggi-do (KR); Sanghyun Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/271,261

(22) PCT Filed: Apr. 7, 2022

(86) PCT No.: PCT/KR2022/005014
§ 371 (c)(1),
(2) Date: Jul. 7, 2023

(87) PCT Pub. No.: WO2022/216074
PCT Pub. Date: Oct. 13, 2022

(65) Prior Publication Data
US 2024/0051593 A1 Feb. 15, 2024

(30) Foreign Application Priority Data

Apr. 7, 2021 (KR) .......................... 10-2021-0045456
Apr. 6, 2022 (KR) .......................... 10-2022-0042643

(51) Int. Cl.
*B62D 1/181* (2006.01)
*B62D 1/185* (2006.01)
*B62D 1/19* (2006.01)

(52) U.S. Cl.
CPC ............. *B62D 1/181* (2013.01); *B62D 1/185* (2013.01); *B62D 1/192* (2013.01)

(58) Field of Classification Search
CPC ........ B62D 1/181; B62D 1/185; B62D 1/192; B62D 1/183
See application file for complete search history.

(56) References Cited

U.S. PATENT DOCUMENTS 9,260,130 B2  2/2016  Mizuno
10,421,475 B2  9/2019  Derocher et al.
(Continued)

FOREIGN PATENT DOCUMENTS

DE  102020117447 B3 *  4/2021  ............. B62D 1/181
DE  102020132014 A1 *  6/2022
(Continued)

OTHER PUBLICATIONS

International Search Report for PCT/KR2022/005014 mailed on Jul. 22, 2022 and its English Machine Translation by the WIPO (now published as WO 2022/216074).
(Continued)

*Primary Examiner* — Drew J Brown
(74) *Attorney, Agent, or Firm* — WOMBLE BOND DICKINSON (US) LLP

(57) ABSTRACT

A steering column for a vehicle is disclosed. An aspect of the present invention may provide a steering column for a vehicle, the steering column comprising: an inner tube having a steering shaft inserted and coupled therein; an outer tube coupled to an outer circumferential surface of the inner tube and having a first hole formed to be recessed in the axial direction on outer surface thereof; a housing coupled to an outer circumferential surface of the outer tube and having a second hole formed to be recessed in the shaft direction at a position corresponding to the first hole on an outer surface thereof; and a driving unit connected to the inner tube and the outer tube to allow the inner tube and the outer tube to be moved forward and backward in the shaft direction, wherein the driving unit includes a block part including a first block accommodated in the first hole and the second hole while being coupled to the outer tube, a moving part coupled to the first block and the second block, and a driving part connected to the moving part and transferring driving (Continued)

force to allow the block part to be moved forward and backward.

20 Claims, 7 Drawing Sheets

(56) References Cited

U.S. PATENT DOCUMENTS

| | | | |
|---|---|---|---|
| 10,974,756 B2 | 4/2021 | Cana et al. | |
| 2006/0283281 A1* | 12/2006 | Li | B62D 1/181 |
| | | | 74/495 |
| 2017/0363189 A1* | 12/2017 | Nunez | F16H 25/2006 |
| 2018/0050720 A1* | 2/2018 | King | B62D 1/184 |
| 2021/0061340 A1* | 3/2021 | Wilkes | F16H 25/20 |
| 2021/0129892 A1* | 5/2021 | Ryne | B62D 1/185 |
| 2022/0324505 A1* | 10/2022 | Ku | B62D 1/192 |
| 2023/0043788 A1* | 2/2023 | Ponikiewski | B62D 1/185 |
| 2023/0090642 A1* | 3/2023 | Ponikiewski | B62D 1/183 |
| | | | 74/493 |

FOREIGN PATENT DOCUMENTS

| | | | |
|---|---|---|---|
| DE | 102023109325 A1 * | 10/2023 | ............. B62D 1/181 |
| FR | 3139782 A1 * | 3/2024 | |
| JP | 6738536 | 8/2020 | |
| KR | 10-0814759 | 3/2008 | |
| KR | 10-2020-0110205 | 9/2020 | |
| KR | 10-2021-0030575 | 3/2021 | |
| WO | 2017/097662 | 6/2017 | |

OTHER PUBLICATIONS

Written Opinion of the International Searching Authority for PCT/KR2022/005014 mailed on Jul. 22, 2022 and its English Machine Translation by the WIPO (now published as WO 2022/216074).

* cited by examiner

STEERING COLUMN FOR VEHICLE

CROSS-REFERENCE TO RELATED APPLICATIONS

This application is the U.S. National Stage of International Patent Application No. PCT/KR2022/005014 filed on Apr. 7, 2022, which claims priority to and the benefit of Korean Patent Application No. 10-2021-0045456, filed on Apr. 7, 2021, and Korean Patent Application No. 10-2022-0042643, filed on Apr. 6, 2022, the disclosures of which are incorporated herein by reference in their entirety.

TECHNICAL FIELD

The present invention relates to a steering column for a vehicle, and more particularly, to a steering column for a vehicle capable of increasing a telescopic operating range in a steering apparatus for a vehicle.

BACKGROUND ART

In general, a steering column for a vehicle is a device formed to surround a steering shaft that transmits a turning force generated by a driver's steering wheel operation to a rack-and-pinion device to support turning of the steering shaft, and coupled to a vehicle body through a bracket to fix a position of the steering shaft.

Such a steering column may have additional functions of telescoping or tilting for driver's convenience, and a tilt device is a device for adjusting a fixed angle of the steering wheel, and a telescopic device is formed by inserting two hollow tubes to enable extension and contraction in an axial direction and has a function of absorbing impact energy as the steering shaft and the steering column collapse when a vehicle collides.

Therefore, the steering apparatus may be divided into a telescopic or tilt steering apparatus according to these functions, and in some cases, a tilt function may be added to the telescopic steering apparatus, and through these functions, the driver may adjust the degree of protrusion or a tilt angle of the steering wheel according to his or her height or body shape, thereby performing a smooth steering operation.

Meanwhile, these days, a vehicle capable of traveling to a destination by itself without operations of a steering wheel, an accelerator pedal, a brake, or the like, by the driver is being developed, and there is a demand to secure a wider space for convenience of the driver sitting in a driver's seat during autonomous driving.

To this end, a method of increasing a telescopic operating range (teles-stroke) of the steering shaft has been attempted, and in a steering column that performs a telescopic operation using a screw in the related art, a method of increasing the teles-stroke by increasing only a length or lead of the screw has a problem in that the method is difficult to implement in consideration of a vehicle space, self-supporting conditions of the screw, or the like.

Therefore, a steering column capable of increasing the telescopic operating range, increasing utilization of the space in the vehicle, and improving overall rigidity by overcoming the aforementioned points is to be studied.

DISCLOSURE

Technical Problem

Embodiments of the present invention are directed to providing a steering column for a vehicle capable of increasing a telescopic operating range through a triple structure of an inner tube, an outer tube, and a housing.

Further, embodiments of the present invention are directed to providing a steering column for a vehicle capable of improving overall rigidity by coupling inner and outer tubes to a moving part and a block part.

Further, embodiments of the present invention are directed to providing a steering column for a vehicle capable of increasing utilization of a space in a vehicle by rotating a screw member in place.

Technical Solution

One aspect of the present invention provides a steering column for a vehicle, the steering column including: an inner tube having a steering shaft inserted and coupled therein; an outer tube coupled to an outer circumferential surface of the inner tube and having a first hole formed to be recessed in an axial direction in an outer surface of the outer tube; a housing coupled to an outer circumferential surface of the outer tube and having a second hole formed to be recessed in the axial direction at a position corresponding to the first hole in an outer surface of the housing; and a driving unit connected to the inner tube and the outer tube to allow the inner tube and the outer tube to be moved forward and backward in the axial direction, wherein the driving unit includes: a block part including a first block accommodated in the first hole and the second hole and coupled to the inner tube and a second block accommodated in the second hole and coupled to the outer tube; a moving part coupled to the first block and the second block; and a driving part connected to the moving part and transmitting a driving force to allow the block part to be moved forward and backward.

The steering column for a vehicle in which the first block and the second block are arranged on a straight line along the axial direction may be provided.

The steering column for a vehicle in which the moving part includes a screw member having one side connected to the driving part to receive the driving force from the driving part, and coupled to the second block, and a nut member that is connected to the other side of the screw member, is able to be moved forward and backward along the screw member in the axial direction, and is coupled to the first block may be provided.

The steering column for a vehicle in which the screw member and the nut member are formed to extend in a direction parallel to the axial direction may be provided.

The steering column for a vehicle in which the screw member is formed with a first screw thread, and the nut member is formed with a second screw thread engaged with the first screw thread at a position corresponding to the first screw thread may be provided.

The steering column for a vehicle in which the screw member includes a first screw having one side connected to the driving part and coupled to the second block and a second screw provided on the other side of the first screw and connected to the nut member may be provided.

The steering column for a vehicle in which the first screw and the second screw are provided to have different leads may be provided.

The steering column for a vehicle in which the first screw and the second screw are provided to have different pitches of the first screw thread may be provided.

The steering column for a vehicle in which the nut member is provided to be larger than an outer diameter of the screw member, and the first screw thread is formed on an outer circumferential surface of the screw member and the second screw thread is formed on an inner circumferential surface of the nut member may be provided.

The steering column for a vehicle in which an outer diameter of the second screw is provided to be equal to or larger than an outer diameter of the first screw may be provided.

The steering column for a vehicle in which the second block is formed with a third screw thread engaged with the first screw thread at the position corresponding to the first screw thread may be provided.

The steering column for a vehicle in which the first screw is coupled to the second block by passing through the second block may be provided.

The steering column for a vehicle in which the nut member is moved forward and backward along the screw member in the axial direction by rotation of the screw member, a position of the screw member being fixed, may be provided.

The steering column for a vehicle in which the driving part includes an actuator that generates power and a gear member connected to a rotating shaft of the actuator and transmitting a driving force to the moving part may be provided.

The steering column for a vehicle in which the gear member includes a worm connected to the actuator and a worm gear having an outer side connected to the worm and an inner side connected to the moving part may be provided.

The steering column for a vehicle in which the gear part further includes a damping member surrounding the worm and the worm gear may be provided.

The steering column for a vehicle further including a stopper supported by the outer tube and having at least a portion in contact with the inner tube may be provided.

The steering column for a vehicle in which the outer tube is formed with a first accommodating groove through which the stopper is accommodated on the outer surface of the outer tube may be provided.

The steering column for a vehicle in which the housing is formed with a second accommodating groove in which the stopper is accommodated may be provided.

The steering column for a vehicle in which the stopper includes a bolt member having at least a portion in contact with the inner tube and an elastic member provided between the inner tube and the bolt member may be provided.

Advantageous Effects

A steering column for a vehicle in accordance with one embodiment of the present invention can increase a telescopic operating range through a triple structure of an inner tube, an outer tube, and a housing.

A steering column for a vehicle in accordance with one embodiment of the present invention can improve overall rigidity by coupling inner and outer tubes to a moving part and a block part.

A steering column for a vehicle in accordance with one embodiment of the present invention can increase utilization of a space in a vehicle by rotating a screw member in place.

MODES OF THE INVENTION

Figure 1:
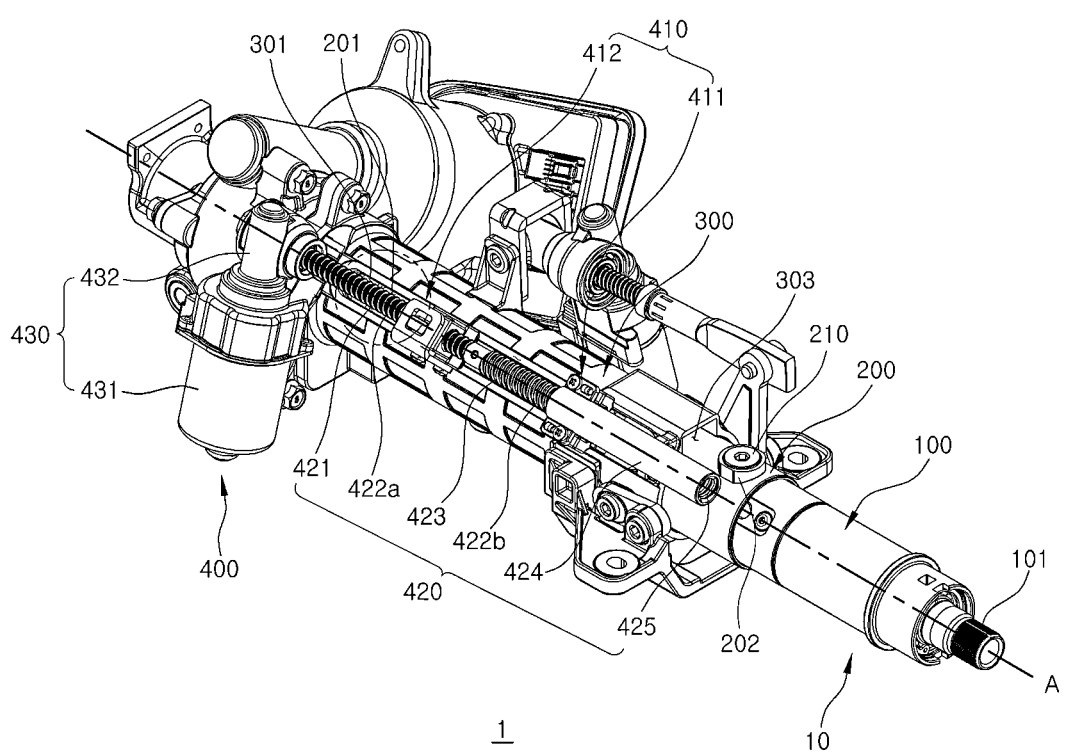
FIG. 1 is a perspective view illustrating a steering apparatus for a vehicle in accordance with one embodiment of the present invention.

Hereinafter, embodiments of the present invention will be described in detail with reference to the accompanying drawings. The following embodiments are provided to completely convey the spirit of the present invention to those skilled in the art to which the present invention pertains. The present invention is not limited to the embodiments shown herein and may be embodied in other forms. In the drawings, parts that bear no relation to descriptions may be omitted in order to clarify the present invention, and elements may be exaggerated in sizes thereof for ease of understanding.

Figure 2:
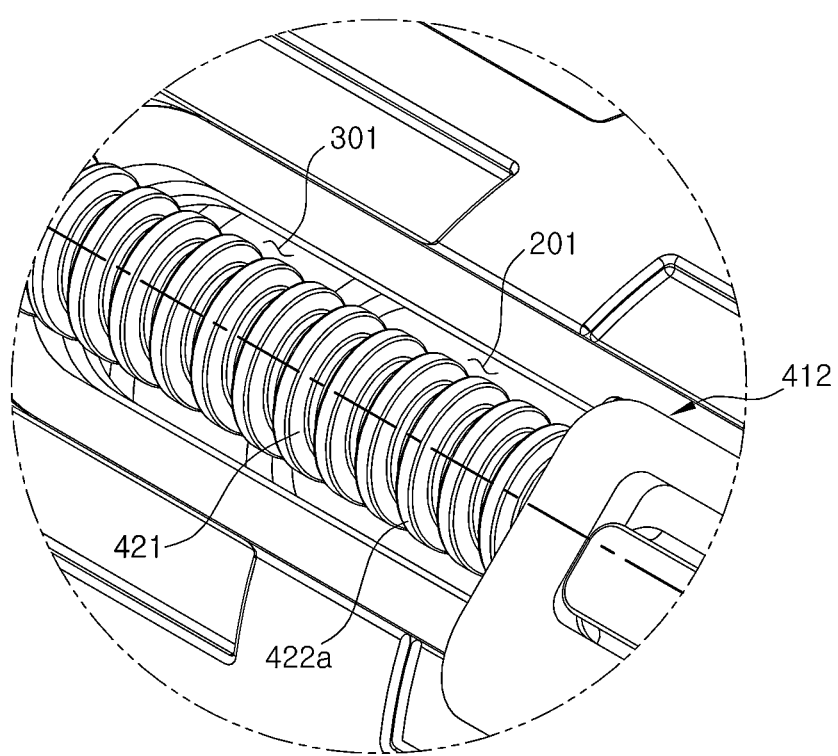
FIG. 2 is an enlarged view of a part of a steering column for a vehicle in accordance with one embodiment of the present invention.
Figure 3:
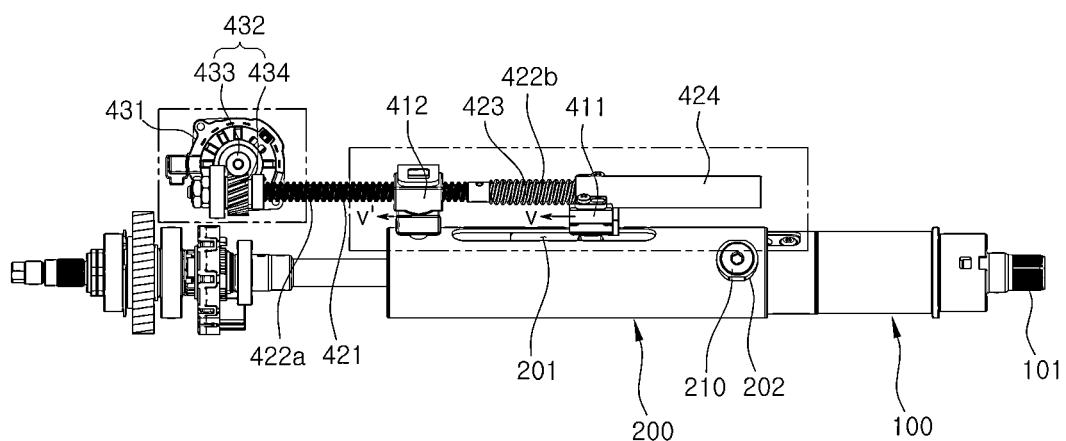
FIG. 3 is a plan view illustrating a part of the steering column for a vehicle in accordance with one embodiment of the present invention.
Figure 4:
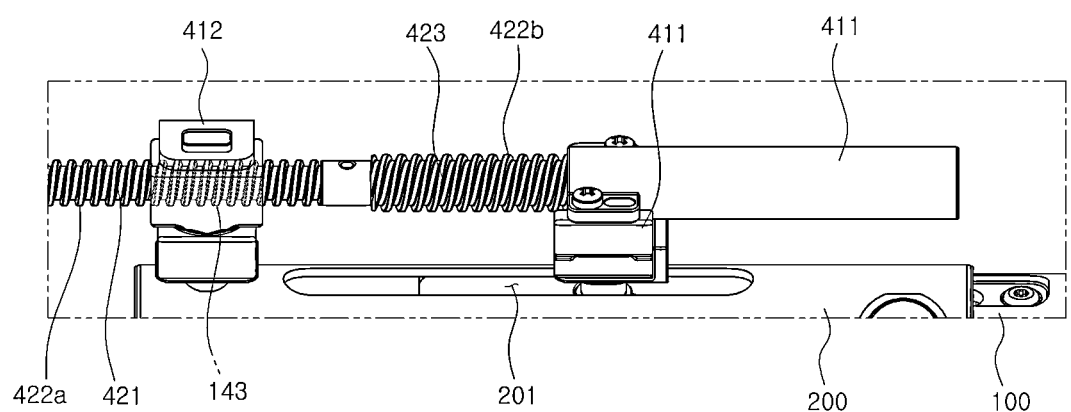
FIG. 4 is a plan view illustrating a block part and a moving part of the steering column for a vehicle in accordance with one embodiment of the present invention.
Figure 5:
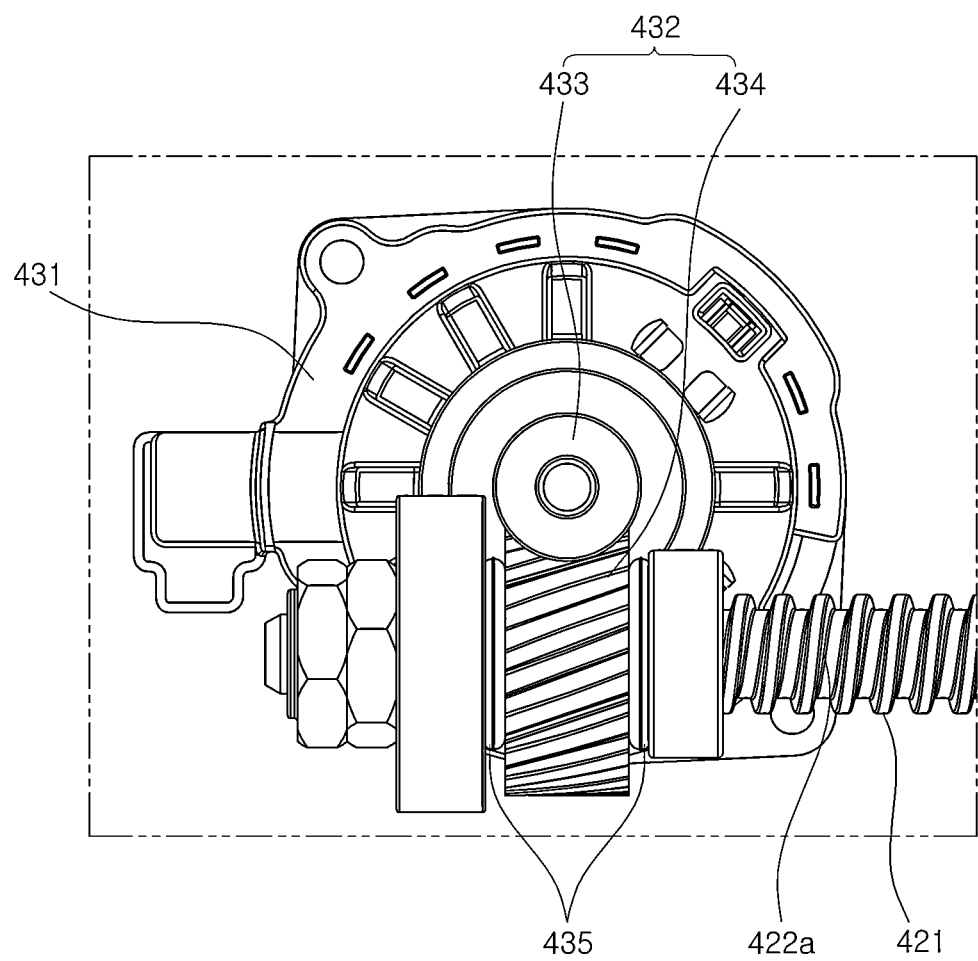
FIG. 5 is a plan view illustrating a driving part of the steering column for a vehicle in accordance with one embodiment of the present invention.
Figure 6:
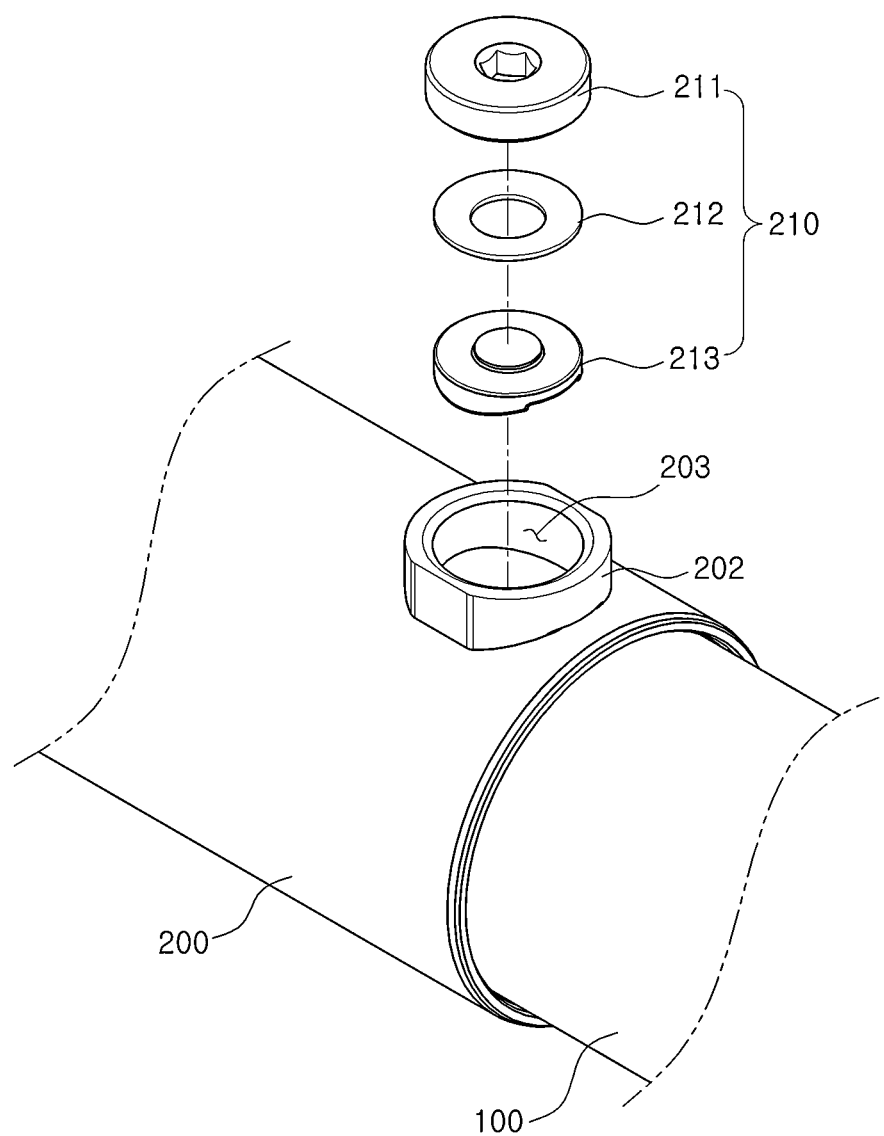
FIG. 6 is a perspective view illustrating a stopper of the steering column for a vehicle in accordance with one embodiment of the present invention.
Figure 7:
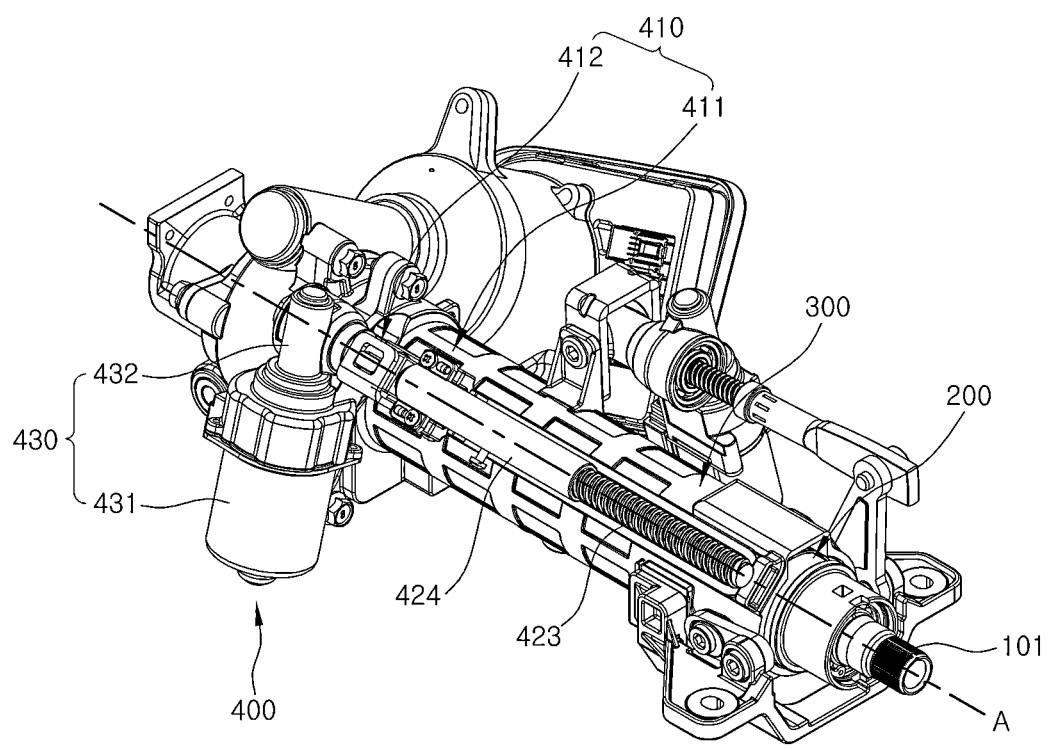
FIG. 7 is a perspective view illustrating a state in which the steering column for a vehicle in accordance with one embodiment of the present invention is operated.

FIG. 1 is a perspective view illustrating a steering apparatus for a vehicle in accordance with one embodiment of the present invention, FIG. 2 is an enlarged view of a part of a steering column for a vehicle in accordance with one embodiment of the present invention, FIG. 3 is a plan view illustrating a part of the steering column for a vehicle in accordance with one embodiment of the present invention, FIG. 4 is a plan view illustrating a block part and a moving part of the steering column for a vehicle in accordance with one embodiment of the present invention, FIG. 5 is a plan view illustrating a driving part of the steering column for a vehicle in accordance with one embodiment of the present invention, FIG. 6 is a perspective view illustrating a stopper of the steering column for a vehicle in accordance with one embodiment of the present invention, and FIG. 7 is a perspective view illustrating a state in which the steering column for a vehicle in accordance with one embodiment of the present invention is operated.

Referring to FIGS. 1 to 7, a steering column 10 for a vehicle in accordance with one embodiment of the present invention may include an inner tube 100 having a steering shaft 101 inserted and coupled therein, an outer tube 200 coupled to an outer circumferential surface of the inner tube 100 and having a first hole 201 formed to be recessed in an axial direction in an outer surface thereof, a housing 300 coupled to an outer circumferential surface of the outer tube 200 and having a second hole 301 formed to be recessed in the axial direction at a position corresponding to the first hole 201 in an outer surface thereof, a driving unit 400 connected to the inner tube 100 and the outer tube 200 to allow the inner tube 100 and the outer tube 200 to be moved forward and backward in the axial direction, and a stopper 210 supported by the outer tube 200 and having at least a portion in contact with the inner tube 100.

The driving unit 400 may be accommodated in the first hole 201 and the second hole 301, and may include a block part 410 including a first block 411 coupled to the inner tube 100 and a second block 412 accommodated in the second hole 301 and coupled to the outer tube 200, a moving part 420 coupled to the first block 411 and the second block 412, and a driving part 430 connected to the moving part 420 and transmitting a driving force to allow the block part 410 to be moved forward and backward. The moving part 420 may include a screw member having one side connected to the driving part 430 to receive the driving force from the driving part 430 and coupled to the second block 412, and a nut member 424 that is connected to the other side of the screw member, is able to be moved forward and backward in the screw member in the axial direction, and is coupled to the first block 411. The screw member may include a first screw 421 having one side connected to the driving part 430 and coupled to the second block 412, and a second screw 423 provided on the other side of the first screw 421 and connected to the nut member 424. The nut member 424 may be coupled to the first block 411 and moved forward and backward together with the inner tube 100, and the first screw 421 may be coupled to the second block 412 and moved forward and backward together with the outer tube 200.

The housing 300 has a hollow shape, and the steering shaft 101, the inner tube 100, and the outer tube 200 may be inserted into the housing 300. The housing 300 may be coupled to the outer tube 200 while surrounding at least a portion of the outer tube 200. A telescopic operation may be performed while the inner tube 100 is drawn in and out of the housing 300. The housing 300 may be coupled to a vehicle body through a mounting bracket or the like, and may have a collision energy absorbing structure to absorb collision energy while performing a collapsing motion with the inner tube 100.

The steering shaft 101 is a part that transmits an operating force when a driver operates a steering wheel. The steering shaft 101 may be coupled to the housing 300 through the inner tube 100 and the outer tube 200. The steering shaft 101 may have an extensible structure and may be coupled to the inner tube 100 to expand and contract according to the movement of the inner tube 100 in the axial direction, thereby performing the telescopic operation of the steering column 10 for a vehicle. Specifically, the steering shaft 101 may be formed in the extensible structure in which an upper shaft and a lower shaft are included, one of the upper shaft and the lower shaft is inserted into the other, and the upper shaft and the lower shaft are formed to be mutually slidable along the axial direction.

The inner tube 100 may be provided in a hollow shape. The steering shaft 101 may be inserted into the inner tube 100 and coupled thereto. The inner tube 100 may be a part into which the steering shaft 101 is inserted and coupled, and when the inner tube 100 is moved with respect to the steering shaft 101 in the axial direction, the steering shaft 101 may be expanded or contracted. The inner tube 100 may be inserted into the outer tube 200 and drawn in or out of the outer tube 200 while sliding on an inner circumferential surface of the outer tube 200, so that the telescopic operation may be performed.

The outer tube 200 may be provided in a hollow shape. The inner tube 100 may be inserted into the outer tube 200 and coupled thereto. The outer tube 200 may be inserted into the housing 300 and drawn in or out of the housing 300 while sliding on an inner circumferential surface of the housing 300, so that the telescopic operation may be performed.

The inner tube 100 and the outer tube 200 may be moved together when the steering shaft 101 moves forward and backward in the axial direction, and the inner tube 100 and the outer tube 200 may have a coupling structure of the inner tube 100 and the outer tube 200 to be independently moved forward and backward in the axial direction.

The inner tube 100 and the outer tube 200 may be coupled to the block part 410 to be moved together according to the movement of the block part 410. Specifically, the inner tube 100 may be connected to the first block 411 and the outer tube 200 may be coupled to the second block 412. The driving part 430 may transmit a driving force to the first block 411 and the second block 412 through the moving part 420 to move the inner tube 100 and the outer tube 200 forward and backward along the axial direction of the steering shaft 101. In this way, the inner tube 100 may be drawn in and out of the outer tube 200 and the outer tube 200 may be drawn in and out of the housing 300.

A coupled state of the inner tube 100 and the outer tube 200 does not mean fitting or tightening coupling, and is not limited to what is illustrated in the drawing, and the coupled state of the inner tube 100 and the outer tube 200 may be provided in various ways.

The outer tube 200 may have the first hole 201 formed to be recessed in the axial direction in the outer surface thereof. The first hole 201 may be formed to pass through the outer surface of the outer tube 200. The first block 411 may be accommodated in the first hole 201. The first block 411 may be moved forward and backward along the first hole 201 in the axial direction. At this time, the inner tube 100 connected to the first block 411 may be moved forward and backward in the axial direction.

The housing 300 may have the second hole 301 formed to be recessed in the axial direction at a position corresponding to the first hole 201 in the outer surface thereof. The second hole 301 may be formed to pass through the outer surface of the housing 300. The first block 411 and the second block 412 may be accommodated in the second hole 301. The first block 411 and the second block 412 may be moved forward and backward along the second hole 301 in the axial direction. At this time, the inner tube 100 connected to the first block 411 and the outer tube 200 connected to the second block 412 may be moved forward and backward in the axial direction. The outer tube 200 may be drawn in and out of the housing 300, and the inner tube 100 may be drawn in and out of the outer tube 200.

The driving unit 400 may be connected to the inner tube 100 and the outer tube 200 to move the inner tube 100 and the outer tube 200 forward and backward in the axial direction. The inner tube 100 may be drawn in and out of the outer tube 200 by the driving unit 400, so that the telescopic operation by which the steering wheel connected to the steering shaft 101 protrudes or retracts may be performed. At this time, the inner tube 100 may slide on the outer tube 200, and the outer tube 200 may slide on the housing 300.

The driving unit 400 may include the block part 410 connected to the inner tube 100 and the outer tube 200, the moving part 420 that transmits a driving force to the block part 410 to move the block part 410 forward and backward, and the driving part 430 that transmits the driving force to the moving part 420. The driving part 430 may transmit the driving force to the moving part 420 and the moving part 420 may transmit the driving force to the block part 410, and thus the inner tube 100 and the outer tube 200 coupled to the block part 410 may be moved forward and backward along the axial direction of the steering shaft 101.

The block part 410 may include the first block 411 accommodated in the first hole 201 and the second hole 301 and coupled to the inner tube 100 and the second block 412 accommodated in the second hole 301 and coupled to the outer tube 200. The first block 411 and the second block 412 may be arranged on a straight line along the axial direction. As illustrated in the drawings, the first block 411 and the second block 412 may be arranged on the straight line along line A.

In the second block 412, a third screw thread 413 engaged with a first screw thread 422a may be formed at a position corresponding to the first screw thread 422a. The first screw 421 may be coupled to the second block 412 by passing through the second block 412, and at this time, when the first screw thread 422a is formed on an outer circumferential surface of the first screw 421, the third screw thread 413 may be formed inside the first block 411.

The shapes of the first block 411 and the second block 412 are not limited to those illustrated in the drawings, and may form a various coupling structure with the inner tube 100, the outer tube 200, the first screw 421, and the nut member 424.

The moving part 420 may include the screw member having one side connected to the driving part 430 to receive the driving force from the driving part 430 and coupled to the second block 412, and the nut member 424 that is connected to the other side of the screw member, is able to be moved forward and backward in the screw member in the axial direction, and is coupled to the first block 411. The moving part 420 may be formed to extend in a direction parallel to the axial direction. In detail, the screw member and the nut member 424 may be formed to extend in a direction parallel to the axial direction.

The screw member may receive a driving force from the driving part 430 and rotate. As the screw member rotates, the second block 412 and the nut member 424 connected to the screw member may be moved forward and backward along the screw member along the axial direction of the steering shaft 101. As the nut member 424 is moved forward and backward, at least a portion of the screw member may be drawn in and out of the nut member 424. At this time, the first block 411 coupled to the nut member 424 may also be moved forward and backward along the axial direction.

That is, the second block 412 and the nut member 424 connected to the screw member are moved forward and backward along the screw member, and thus the second block 412 and the first block 411 coupled to the nut member 424 may be moved forward and backward on the screw member. In this way, the inner tube 100 and the outer tube 200 coupled to the first block 411 and the second block 412 may be moved forward and backward. The telescopic operation in which the screw member rotates around the axial direction in place, the inner tube 100 and the outer tube 200 are drawn in and out of the housing 300 through the movement of the first block 411 and the second block 412, and the steering wheel connected to the steering shaft 101 protrudes or retracts may be performed.

The nut member 424 may be moved forward and backward along the screw member in the axial direction by the rotation of the screw member, and at this time, the position of the screw member may be fixed. That is, a relative position of the screw member in relation to the driving part 430 may coincide before and after the telescopic operation. By constantly providing a relative position of the screw member in this way, it is possible to change a design structure such as using the space for forward and backward movement of the screw member in the steering column 10 for a vehicle in the related art for other purposes, thereby increasing utilization of the space in the vehicle.

The screw member may be formed with first screw threads 422a and 422b, and the nut member 424 may be formed with a second screw thread 425 engaged with the first screw threads 422a and 422b at a position corresponding to the first screw threads 422a and 422b. The nut member 424 may be moved forward and backward on the screw member according to the rotation of the screw member. At least a portion of the screw member may be drawn in and out of the nut member 424.

The nut member 424 may be provided to have a larger outer diameter than the screw member, the screw member may be formed with the first screw threads 422a and 422b on its outer circumferential surface, and the nut member 424 may be formed with the second screw thread 425 therein. The second block 412 of the block part 410 may be formed with the third screw thread 413 at a position corresponding to the first screw threads 422a and 422b, and when the first screw threads 422a and 422b are formed on the outer circumferential surface of the first screw 421, the first block 411 may be formed with the third screw thread 413 therein.

The screw member may include the first screw 421 having one side connected to the driving part 430 and coupled to the second block 412, and the second screw 423 provided on the other side of the first screw 421 and connected to the nut member 424.

The first screw 421 and the second screw 423 may have different leads. For example, referring to the drawings, a lead of the first screw 421 may be provided to be smaller than a lead of the second screw 423. Since the lead of the first screw 421 is provided to be smaller than the lead of the second screw 423, when the first screw 421 rotates once, the first block 411 may be moved forward and backward a relatively longer distance than the second block 412. That is, a forward and backward speed of the inner tube 100 may be provided to be set higher than a forward and backward speed of the outer tube 200. In this way, when the forward and backward movements are respectively completed in the order of the outer tube 200 and the inner tube 100, a difference between completion times of forward and backward movements of the outer tube 200 and the inner tube 100 may be reduced.

In addition, by reducing a protruding distance of the inner tube 100 and the outer tube 200, the space occupied by the steering column 10 may be minimized at the time of the telescopic operation, and thus the installation space may be easily secured and interference with surrounding parts may be prevented. However, without being limited thereto, a lead relationship between the first screw 421 and the second screw 423 may be set in consideration of a length ratio of the first screw 421 and the second screw 423.

Pitches of the first screw 421 and the second screw 423 may be differently provided. For example, when a pitch of the first screw 421 is provided to be smaller than a pitch of the second screw 423 and screws having the same line are used, since the lead of the second screw 423 is longer than that of the first screw 421, the first block 411 may be moved forward and backward at a faster speed than the second block 412. Accordingly, the inner tube 100 coupled to the first block 411 may be moved forward and backward at a faster speed than the outer tube 200 coupled to the second block 412.

The first screw 421 and the second screw 423 may be provided with different lines of screws. For example, when a two-line screw is used as the second screw 423, a single-line screw is used as the first screw 421, and the pitches of the first screw 421 and the second screw 423 are the same, since the lead of the second screw 423 is longer than the lead of the first screw 421, the first block 411 may be moved forward and backward at a faster speed than the second block 412.

The second screw 423 may have an outer diameter equal to or larger than that of the first screw 421. Thereby, when the nut member 424 is moved forward and backward on the screw member, the nut member 424 may be moved forward and backward along the second screw 423 and the first screw 421.

The driving part 430 may be connected to the moving part 420, transmit a driving force, and move the block part 410 forward and backward. The block part 410 may be coupled to the inner tube 100 and the outer tube 200, and thus the inner tube 100 and the outer tube 200 may also be moved according to the forward and backward movement of the block part 410. The driving part 430 may include an actuator 431 that generates power and a gear member 432 that is connected to a rotating shaft of the actuator 431 and transmits a driving force to the moving part 420. The gear member 432 may include a worm 433 connected to the actuator 431 and a worm gear 434 having an outer side connected to the worm 433 and an inner side connected to the moving part 420.

In detail, the first screw 421 may be interlocked with the worm gear 434 of the gear member 432 to receive the driving force of the actuator 431, and thus the first screw 421 and the second screw 423 may rotate around the axial direction. At this time, the first screw 421 and the second screw 423 may rotate in place around the axial direction. As the second screw 423 rotates in place, the nut member 424 coupled to the second block 412 may be moved forward and backward on the second screw 423.

The actuator 431 may be provided as a motor. The driving force transmitted from the motor to a gear of the worm 433 through the worm 433 may be transmitted to the first screw 421 and the second screw 423 so that the block part 410 is moved forward and backward, and thus the nut member, the inner tube 100, and the outer tube 200 may be moved forward and backward.

The driving part 430 may include a damping member 435 that alleviates an impact of the gear member 432. The damping member 435 may be provided between the first screw 421 and the gear member 432. However, without being limited thereto, the damping member 435 may be provided to surround the worm 433 or the worm gear 434. The damping member 435 may be made of an elastic body.

Referring to FIG. 6, the stopper 210 may be supported by the outer tube 200 and at least a portion thereof may be in contact with the inner tube 100. The stopper 210 may increase the rigidity of the tubes by increasing a coupling force between the inner tube 100 and the outer tube 200. The stopper may be provided between the outer tube 200 and the housing 300.

The outer tube 200 may be formed with a first accommodating groove 203 through which the stopper 210 is accommodated on the outer surface of the outer tube 200. The housing 300 may be formed with a second accommodating groove 303 in which the stopper 210 is accommodated. As illustrated in the drawings, the second accommodating groove 303 may be formed in a position where at least a portion of the housing 300 protrudes, but without being limited thereto, may be provided to be formed in a recessed position on an inner surface of the housing 300.

The outer tube 200 may include a guide 202 protruding in a direction perpendicular to the axial direction along the first accommodating groove 203. The guide 202 may support the stopper 210 to prevent the stopper 210 from being separated from the second accommodating groove 303. The guide 202 may be accommodated in the second accommodating groove 303 of the housing 300.

The stopper 210 may include a bolt member 211 having at least a portion in contact with the inner tube 100 and an elastic member 212 interposed between the inner tube 100 and the bolt member 211. A bush member 213 may be provided between the elastic member 212 and the bolt member 211. The bolt member 211 may have at least a portion in contact with the inner tube 100 to increase the coupling force between the inner tube 100 and the outer tube 200, thereby increasing the rigidity of the tube. The elastic member 212 or the bush member 213 may be provided between the inner tube 100 and the bolt member 211, and thus the force applied to the bolt member 211 may be dispersed and the separation of the bolt member 211 from the first accommodating groove 203 may be prevented.

Hereinafter, a method of operating the steering column 10 for a vehicle in accordance with one embodiment of the present invention will be described. The steering column 10 for a vehicle in accordance with one embodiment of the present invention may move the inner tube 100 and the outer tube 200 forward and backward in the axial direction of the steering shaft 101 through the driving part 430, the moving part 420, and the block part 410 of the driving unit 400, so that the telescopic movement may be performed.

The driving force may be transmitted to the moving part 420 through the actuator 431, the worm 433, and the worm gear 434 of the driving part 430. As the first screw 421 and the second screw 423 of the moving part 420 rotate, the second block 412 and the nut member 424 may be moved forward and backward in the axial direction of the steering shaft 101. The first block 411 coupled to the nut member 424 may also be moved forward and backward in the axial direction of the steering shaft 101. The inner tube 100 coupled to the first block 411 and the outer tube 200 coupled to the second block 412 may also be moved forward and backward in the axial direction of the steering shaft 101.

The rigidity of the tubes may be increased by increasing the coupling force between the inner tube 100 and the outer tube 200 through the stopper 210 provided in the outer tube 200.

The lead of the first screw 421 may be provided to be smaller than the lead of the second screw 423. The lead of the first screw 421 may be provided to be smaller than the lead of the second screw 423, so that the forward and backward speed of the second block 412 may be smaller than the forward and backward speed of the first block 411. In this way, the inner tube 100 coupled to the first block 411 may have a larger forward and backward speed than the outer tube 200 coupled to the second block 412. In this way, when the forward and backward movements are respectively completed in the order of the outer tube 200 and the inner tube 100, the difference between completion times of forward and backward movements of the outer tube 200 and the inner tube 100 may be reduced.

As described above, the steering column 10 for a vehicle in accordance with one embodiment of the present invention can increase the telescopic operating range through a triple structure of the inner tube 100, the outer tube 200, and the housing 300. Through the triple structure in which the inner tube 100, the outer tube 200, and the housing 300 are each provided to be overlapped, the telescopic operating range can be increased as compared with a double structure in which only the inner tube 100 and the outer tube 200 or the tube and the housing 300 are provided. In the case of the triple structure, due to the sum of the distance that the inner tube 100 is able to slide and the distance that the outer tube 200 is able to slide, the teles-stroke can be greatly increased as compared with the double structure in the related art. In this way, the space occupied by the tubes of the steering column 10 and the steering column 10 can be minimized at the time of the telescopic operation, and thus the installation space can be easily secured and interference with surrounding parts can be prevented.

In addition, by providing the lead of the first screw 421 of the screw member smaller than the lead of the second screw 423, when the forward and backward movements are completed in the order of the outer tube 200 and the inner tube 100, the difference between completion times of forward and backward movements of the outer tube 200 and the inner tube 100 can be reduced. Further, the space occupied by the steering column 10 at the time of the telescopic operation can be minimized by reducing the protruding distances of the inner tube 100 and the outer tube 200 at the time of the telescopic operation.

Further, by rotating the screw member of the moving part 420 in place by the driving part 430, and moving the nut member 424 forward and backward on the screw member, the space required for the movement of the screw member can be minimized. In this way, the space occupied by the screw member of the steering column 10 and the steering column 10 can be minimized at the time of the telescopic operation, and thus the installation space can be easily secured and interference with surrounding parts can be prevented. Since the telescopic operating range can be increased without increasing the overall size of the steering column 10, the installation space of the steering column 10 can be easily secured.

In addition, since a structure in which each component is coupled as a whole is formed through a structure in which the inner tube 100 is coupled to the first block 411 and the nut member 424, the outer tube 200 is coupled to the second block 412 and the screw member, and the screw member is coupled to the nut member 424, the force applied to the steering column 10 can be effectively dispersed. In this way, the overall rigidity of the steering column 10 can be improved. In addition, the overall rigidity of the steering column 10 can be improved through the stopper 210.

In the above, specific embodiments have been illustrated and described. However, the present invention is not limited to the above-described embodiments, and it will be apparent to those skilled in the art that various modifications and variations can be made in the present invention without departing from the technical spirit of the present invention defined in the claims.

The invention claimed is:

1. A steering column for a vehicle, the steering column comprising:
    an inner tube having a steering shaft inserted and coupled therein;
    an outer tube coupled to an outer circumferential surface of the inner tube and having a first hole formed to be recessed in an axial direction in an outer surface of the outer tube;
    a housing coupled to an outer circumferential surface of the outer tube and having a second hole formed to be recessed in the axial direction at a position corresponding to the first hole in an outer surface of the housing; and
    a driving unit connected to the inner tube and the outer tube to allow the inner tube and the outer tube to be moved forward and backward in the axial direction,
    wherein the driving unit includes:
    a block part including a first block accommodated in the first hole and the second hole and coupled to the inner tube and a second block accommodated in the second hole and coupled to the outer tube;
    a moving part coupled to the first block and the second block; and
    a driving part connected to the moving part and transmitting a driving force to allow the block part to be moved forward and backward.

2. The steering column of claim 1, wherein the first block and the second block are arranged on a straight line along the axial direction.

3. The steering column of claim 1, wherein the moving part includes:
    a screw member having one side connected to the driving part to receive the driving force from the driving part, and coupled to the second block; and
    a nut member that is connected to the other side of the screw member, is able to be moved forward and backward along the screw member in the axial direction, and is coupled to the first block.

4. The steering column of claim 3, wherein the screw member and the nut member are formed to extend in a direction parallel to the axial direction.

5. The steering column of claim 3, wherein the screw member is formed with a first screw thread, and
    the nut member is formed with a second screw thread engaged with the first screw thread at a position corresponding to the first screw thread.

6. The steering column of claim 5, wherein the screw member includes:
    a first screw having one side connected to the driving part and coupled to the second block; and
    a second screw provided on the other side of the first screw and connected to the nut member.

7. The steering column of claim 6, wherein the first screw and the second screw are provided to have different leads.

8. The steering column of claim 7, wherein the first screw and the second screw are provided to have different pitches of the first screw thread.

9. The steering column of claim 6, wherein the nut member is provided to be larger than an outer diameter of the screw member, and
    the first screw thread is formed on an outer circumferential surface of the screw member and the second screw thread is formed on an inner circumferential surface of the nut member.

10. The steering column of claim 6, wherein an outer diameter of the second screw is provided to be equal to or larger than an outer diameter of the first screw.

11. The steering column of claim 6, wherein the second block is formed with a third screw thread engaged with the first screw thread at the position corresponding to the first screw thread.

12. The steering column of claim 10, wherein the first screw is coupled to the second block by passing through the second block.

13. The steering column of claim 3, wherein the nut member is moved forward and backward along the screw member in the axial direction by rotation of the screw member, a position of the screw member being fixed.

14. The steering column of claim 1, wherein the driving part includes:
    an actuator that generates power; and
    a gear member connected to a rotating shaft of the actuator and transmitting a driving force to the moving part.

15. The steering column of claim 14, wherein the gear member includes:

a worm connected to the actuator; and
a worm gear having an outer side connected to the worm and an inner side connected to the moving part.

16. The steering column of claim 15, wherein the gear member further includes a damping member surrounding the worm and the worm gear.

17. The steering column of claim 1, further comprising a stopper supported by the outer tube and having at least a portion in contact with the inner tube.

18. The steering column of claim 17, wherein the outer tube is formed with a first accommodating groove through which the stopper is accommodated on the outer surface of the outer tube.

19. The steering column of claim 17, wherein the housing is formed with a second accommodating groove in which the stopper is accommodated.

20. The steering column of claim 17, wherein the stopper includes: a bolt member having at least a portion in contact with the inner tube; and an elastic member provided between the inner tube and the bolt member.

\* \* \* \* \*